United States Patent
Khan

(10) Patent No.: US 7,697,618 B2
(45) Date of Patent: Apr. 13, 2010

(54) MULTIPLEXING SCHEME FOR AN ORTHOGONAL FREQUENCY DIVISION MULTIPLEXING SYSTEM

(75) Inventor: Farooq Ullah Khan, Monmouth, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 952 days.

(21) Appl. No.: 10/864,279

(22) Filed: Jun. 9, 2004

(65) Prior Publication Data

US 2005/0276336 A1 Dec. 15, 2005

(51) Int. Cl.
*H04L 27/28* (2006.01)
(52) U.S. Cl. .................... 375/260; 375/340; 455/522
(58) Field of Classification Search ............ 375/260, 375/340; 370/210, 206, 208, 480; 379/93.01; 455/522
See application file for complete search history.

(56) References Cited

U.S. PATENT DOCUMENTS

| | | | | |
|---|---|---|---|---|
| 5,844,894 A * | 12/1998 | Dent | ........... | 370/330 |
| 6,871,046 B2 * | 3/2005 | Kitagawa et al. | ........... | 455/17 |
| 7,242,958 B2 * | 7/2007 | Chung et al. | ........... | 455/522 |
| 2004/0097238 A1 | 5/2004 | Hwang et al. | ........... | 455/447 |
| 2004/0179494 A1 * | 9/2004 | Attar et al. | ........... | 370/332 |
| 2004/0196780 A1 * | 10/2004 | Chin et al. | ........... | 370/208 |
| 2005/0068908 A1 * | 3/2005 | Qian et al. | ........... | 370/278 |

FOREIGN PATENT DOCUMENTS

| | | |
|---|---|---|
| EP | 0 680 168 | 2/1995 |
| WO | WO 97/32441 | 4/1997 |

OTHER PUBLICATIONS

Rohling et al., "Performance of an OFDM-TDMA Mobile Communication System", Institute of Telecommunications, Technical University Braunschweig, IEEE 1996.*
European International Search Report EP 05 25 3431 dated Sep. 15, 2005.
European International Search Report EP 05 25 3431 dated Sept. 15, 2005.

* cited by examiner

*Primary Examiner*—David C Payne
*Assistant Examiner*—Leon Flores
(74) *Attorney, Agent, or Firm*—Williams, Morgan & Amerson, PC

(57) ABSTRACT

A method is provided for controlling transmissions between a base station and a mobile station in a wireless system using a plurality of subcarriers. A subcarrier allocation scheme is proposed where a total scheduling interval is divided into at least two sub-intervals. In a first interval, data transmission takes place using a large number of subcarriers. In a second interval, a smaller number of subcarriers are used for transmission. In a time-synchronized system, the first interval overlaps with the first interval in at least some neighboring cells and the second interval overlaps with the second interval in at least some neighboring cells.

15 Claims, 5 Drawing Sheets

| Cell-2 | SC1-8 | SC1 | SC1-8 | SC1,SC2 |
|---|---|---|---|---|
| Cell-3 | SC1-8 | SC2 | SC1-8 | SC3,SC4 |
| Cell-4 | SC1-8 | SC3 | SC1-8 | SC5,SC6 |
| Cell-1 | SC1-8 | SC4 | SC1-8 | SC7,SC8 |
| Cell-5 | SC1-8 | SC5 | SC1-8 | SC1,SC2,SC3 |
| Cell-6 | SC1-8 | SC6 | SC1-8 | SC4 |
| Cell-7 | SC1-8 | SC7 | SC1-8 | SC5,SC6,SC7 |
| | Slot-1 | Slot-2 | Slot-3 | Slot-4 |

MULTIPLEXING SCHEME FOR AN ORTHOGONAL FREQUENCY DIVISION MULTIPLEXING SYSTEM

BACKGROUND OF THE INVENTION

1. Field of the Invention

This invention relates generally to telecommunications, and more particularly, to wireless communications.

2. Description of the Related Art

Orthogonal Frequency Division Multiplexing (OFDM) modulation makes an efficient use of its radio spectrum by placing modulated subcarriers as close as possible without causing Inter-Carrier Interference (ICI). OFDM modulation has been adopted in various standards, most notably digital audio broadcast (DAB), digital video broadcast (DVB), asymmetric digital subscriber line (ADSL), IEEE LAN (802.11a and 802.11g) and IEEE MAN 802.16a. OFDM modulation is also being considered for various next generation wireless standards.

The selection of subcarriers used by each cell in a wireless system has significant ramifications regarding the rate at which data can be transmitted to a mobile station. For example, generally, the greater the number of subcarriers, the higher the data rate that may be supported. However, as the number of subcarriers increases, the amount of power that may be allocated to a subcarrier is generally reduced. For example, if eight subcarriers are employed to transmit data, then only about ⅛ of the total power is typically allocated to each subcarrier. For mobile stations with high signal to noise ratios (SNRs), such as those near a transmitting base station, these low power signals may be adequate, and relatively high data rates may be acheived. However, for mobile stations that are more distant or are subject to interference from adjacent cells, some or all of the subcarriers may not have sufficient power to reliably deliver data signals to the mobile stations.

The low SNRs experienced by the "weak" mobile stations may be overcome by reducing the number of subcarriers and allocating more power to each of the remaining subcarriers. For example, if only two subcarriers are used, then ½ of the available power may be allocated to each of the subcarriers. The higher power will normally result in improved delivery of data to the "weak" mobile stations, but will result in lower data rates for the "strong" mobile stations.

The present invention is directed to overcoming, or at least reducing, the effects of, one or more of the problems set forth above.

SUMMARY OF THE INVENTION

In one embodiment of the present invention, a method is provided for communicating over a plurality of subcarriers. The method comprises transmitting information over a first portion of the subcarriers during a first period of time, and transmitting information over a second portion of the subcarriers during a second period of time.

In an alternative embodiment of the present invention, a method is provided for communicating over a plurality of subcarriers. The method comprises receiving information over a first portion of the subcarriers during a first period of time, and receiving information over a second portion of the subcarriers during a second period of time.

BRIEF DESCRIPTION OF THE DRAWINGS

The invention may be understood by reference to the following description taken in conjunction with the accompanying drawings, in which like reference numerals identify like elements, and in which:

FIG. 7 stylistically illustrates an exemplary subcarrier allocation in which data is multiplexed over two intervals.

Figure 1:
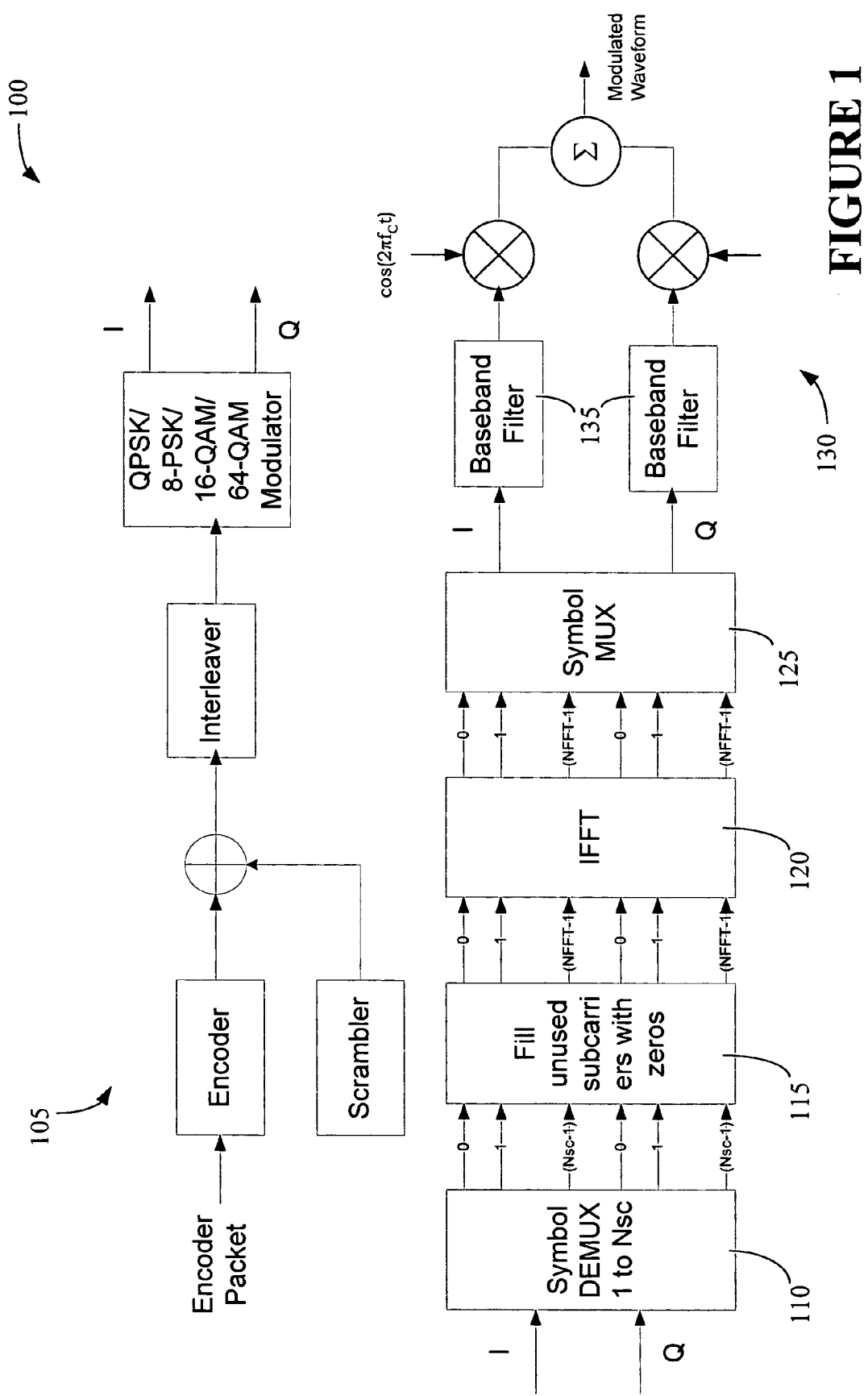
FIG. 1 illustrates a stylized representation of an OFDM transmitter chain.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a subcarrier allocation scheme is proposed where a total scheduling interval is divided into at least two sub-intervals. In a first interval, data transmission takes place using a large number of subcarriers. In a second interval, a smaller number of subcarriers are used for transmission. In a time-synchronized system, the first interval overlaps with the first interval in at least some neighboring cells and the second interval overlap with the second interval in at least some neighboring cells. That is, multiple cells are transmitting at substantially the same time. This approach improves the system throughput by providing two distinct allocation schemes that benefit differently situated mobile stations within each cell. For example, the second interval benefits mobile stations located at the fringe of a cell. The mobile stations located at the fringe may experience interference from transmissions within an adjacent cell on the same subcarrier. Thus, those skilled in the art will appreciate that the probability of sub-carrier collision, i.e. transmission on the same subcarrier from more than one neighboring cells, during the second interval, when a smaller number of subcarriers are used, is substantially lower than during the first interval, when a larger number of subcarriers are used. Further, the power used to transmit within the cell may be concentrated when fewer subcarriers are used. Greater power should ordinarily result in improved performance of mobile stations experiencing low SNR ratios.

The first interval benefits mobile stations that have a higher SNR, such as mobile stations located near a base station. Those skilled in the art will appreciate that using a larger number of subcarriers allows data to be transmitted at higher rate. Thus, during the first interval, the mobile stations with a high SNR will receive data at a substantially improved rate. In this case, neighboring cells may also be transmitting over a larger number of subcarriers leading to subcarrier collisions. Those skilled in the art will appreciate that subcarrier collisions in this case introduce little interference because good users located near a given base station are, in general, farther away from the neighboring cells.

FIG. 1 illustrates a stylized representation of a conventional OFDM transmitter chain 100. Generally, a set of information bits called an encoder packet is coded, interleaved and modulated into Q symbols and I symbols by hardware/software/firmware 105. A group of the I and Q symbols are serial-to-parallel converted by a de-multiplexer 110 and mapped to available subcarriers. Unused subcarriers are filled with zeros, and thus, carry no symbols, as stylistically represented at 115. At 120 an IFFT (Inverse Fast Fourier Transform) operation is performed on the subcarrier symbols and the resulting symbols are parallel-to-serial converted by a multiplexer 125 to form a time-domain signal that is quadrature modulated and converted to an RF frequency for transmission by hardware/software/firmware 130. In some embodiments of the OFDM transmitter chain 100, a baseband filter 135 may be employed prior to converting to the RF frequency.

Figure 2:
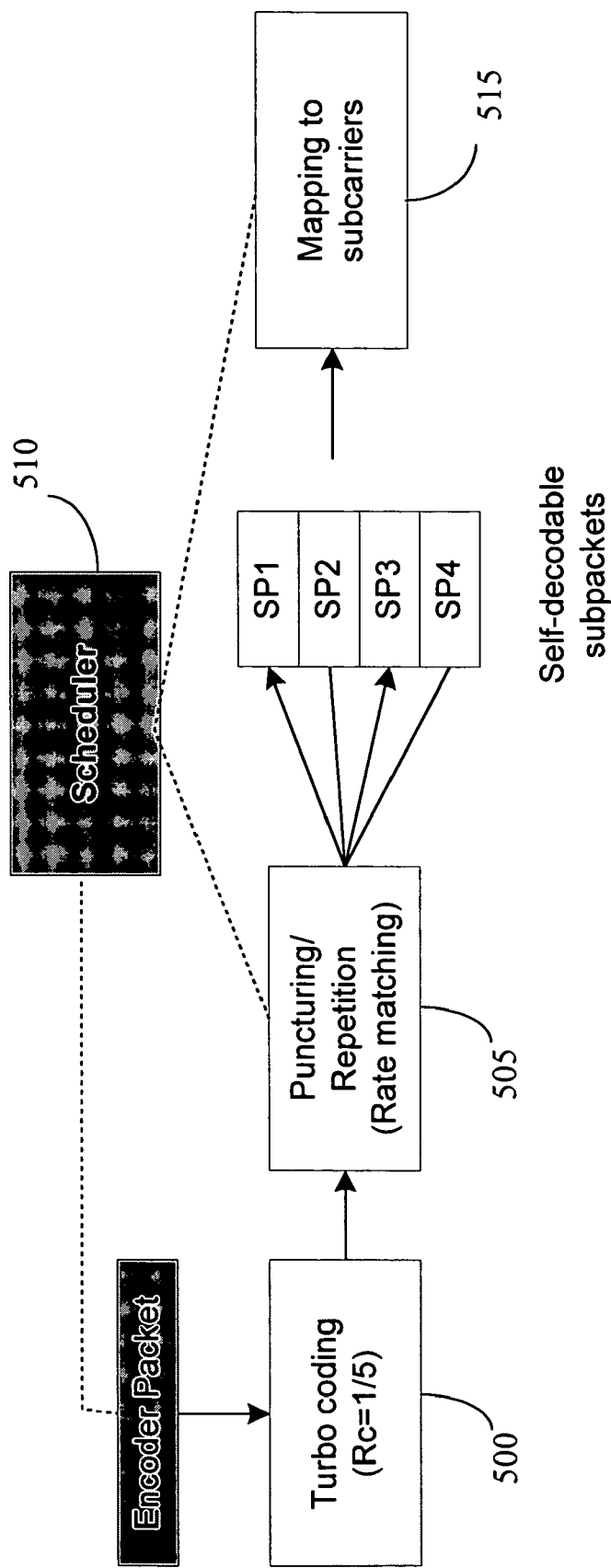
FIG. 2 illustrates a more detailed representation of a portion of the OFDM transmitter chain of FIG. 1.

In a communication system using Hybrid ARQ, the subcarriers can be allocated on a subpacket-by-subpacket basis. An example of subpackets formation in a Hybrid ARQ system is shown in FIG. 2. An information packet, referred to herein as the encoder packet, is provided as an input signal to a channel encoder 500. In an exemplary embodiment of the instant invention, the channel encoder 500 may employ turbo coding with rate 1/5 code. The channel encoder 500 adds redundancy to the information providing capability to correct errors at the receiver. A sequence of coded bits provided by the encoder 500 is punctured and/or repeated at 505 to form subpackets, such as subpackets SP1-SP4. Those skilled in the art will appreciate that the number of subpackets formed are a function of design criteria and depends, among other factors, upon the base coding rate and the maximum number of retransmission attempts allowed in the Hybrid ARQ process. In an exemplary embodiment of the instant invention, the four subpackets SP1-SP4 formed from the information packet are each self-decodable, i.e. the information packet (encoder packet) can potentially be recovered from any single one of the subpackets. However, the principles of the present invention can readily be applied to the case of non self-decodable subpackets.

The subpackets SP1-SP4 may then be routed or mapped to appropriate subcarriers under the control of a scheduler 210, as illustrated at 215. By controlling the mapping of the subpackets SP1-SP4, a "preferred" subcarrier allocation may be effected.

The user data rate in an OFDM system can be written as:

$$R = K \cdot R_c \left( \frac{S_{used}}{S_{total}} \right) R_s \text{ bits/sec}$$

Figure 3:
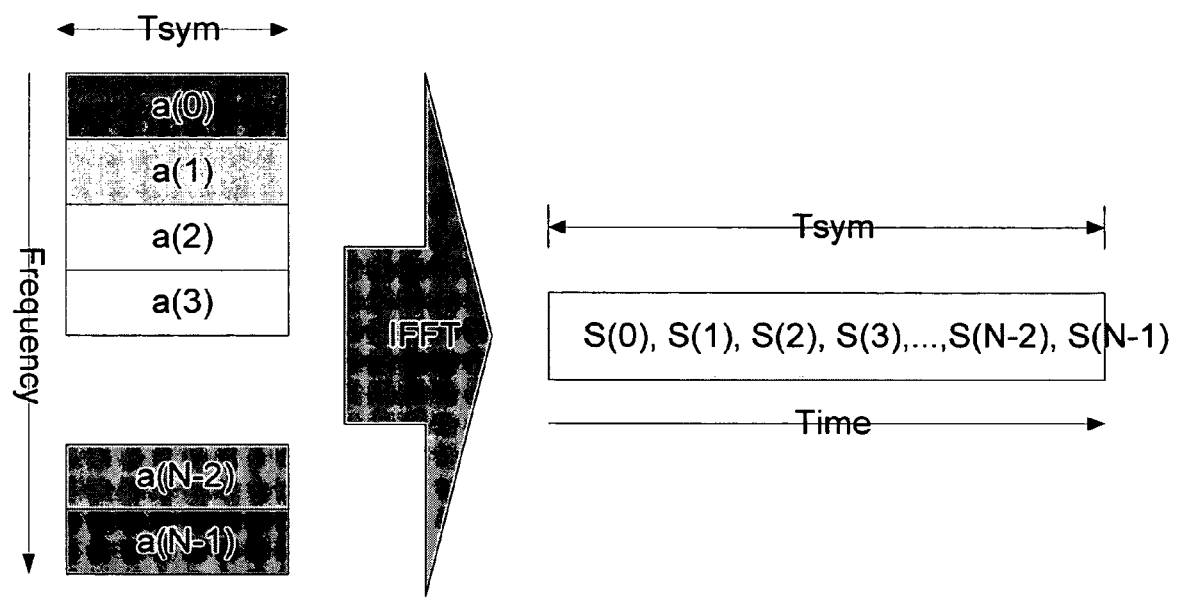
FIG. 3 illustrates an exemplary technique for forming subpackets and assigning the subpackets to specified subcarriers in a Hybrid ARQ system.

Where
K is the modulation order ($2^K$), for example, K=1,2,3,4 for BPSK, QPSK, 8-PSK and 16-QAM modulation respectively
$R_c$ is the channel-coding rate
$S_{used}$ is the number of subcarriers used for data transmission
$S_{total}$ is the total number of subcarriers
$R_s$ is the sampling rate in samples/second The IFFT operation of FIG. 1 is further expanded in FIG. 3. A total of N data symbols at the output of serial-to-parallel converter denoted as a(0), a(1), ..., a(N−1) are fed to the IFFT block. At the output of the IFFT block, we get another set of N symbols denoted as S(0), S(1), ..., S(N−1). These symbols are parallel-to-serial (multiplexed) converted to form a time-domain signal called an OFDM symbol.

As noted above, for a given modulation and coding scheme, a higher data rate can be supported by using a larger number of subcarriers for transmission. In a wireless communication system, users closer to the base station experience much higher signal-to-interference-plus-noise ratio (SINR) compared to weak users at the edge of the cell. The users edge of the cell see larger interference from neighboring cells that limits the SINR for these users.

Figure 4:
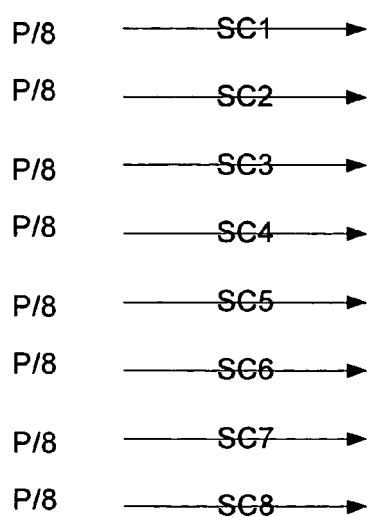
FIG. 4 illustrates a stylized representation of one embodiment of a subcarrier allocation.

A high SINR for good users supports higher data rates. A higher data rate can be achieved by using larger number of subcarriers, a higher order modulation and/or a higher coding. From the performance point of view, the number of subcarriers is first increased when higher data rates are desired. This allows using a more robust modulation and coding for the same data rate. To further increase the data rate when the system is fully loaded i.e. all the subcarriers are used, modulation order and/or coding rate can be increased. An example of data transmission using 8 subcarriers with power equally split among the subcarriers is depicted in FIG. 4.

Figures 5, 6:
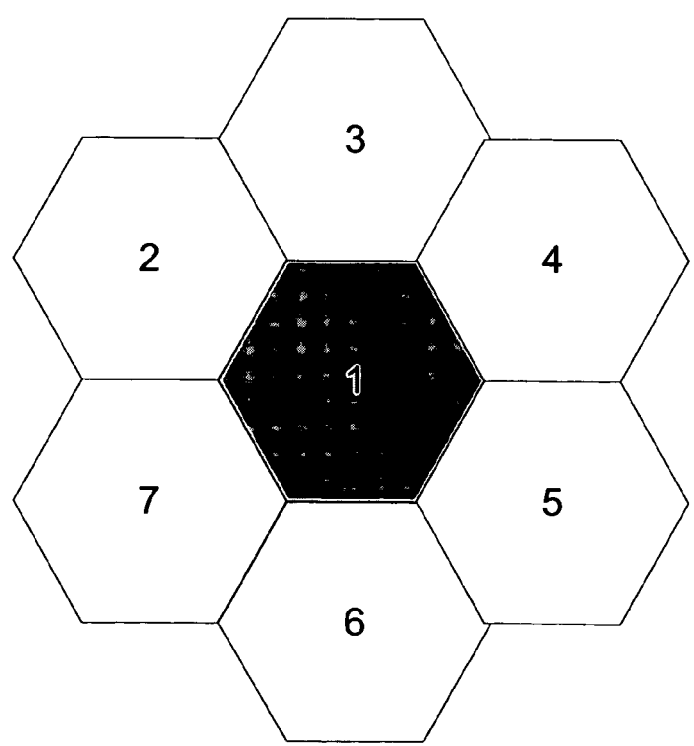
FIG. 5 illustrates a stylized representation of another embodiment of a subcarrier allocation.
FIG. 6 illustrates a stylized representation of a cell layout in a wireless telecommunications system.

As discussed above, the data rates for the weak users in the system are limited by the lower SINR. Therefore, a supportable data rate by a weak user can be achieved by using fewer subcarriers potentially employing the most robust modulation and coding. When fewer subcarriers are used for transmission to a weak user, all the available base station power P may be concentrated on these fewer subcarriers, as shown in FIG. 5. For example, in the illustrative embodiment of FIG. 5, the available power is divided equally among two subcarriers, each receiving half of the available power. The increased power helps to increase the SINR over the subcarriers used for transmission. No power is sent on subcarriers not used for transmission. Those skilled in the art will appreciate that the division and allocation of power among the subcarriers may take on any of a variety of forms without departing from the spirit and scope of the instant invention.

An exemplary cell layout is shown in FIG. 6. Cell 1, because it borders on cells 2-7 may experience interference from its six neighboring cells 2-7, owing to overlap of signals along the edges of adjacent cells. That is, a mobile station near the edge of cell 1 adjacent cell 2 may receive signals originating in both cells 1 and 2, which may interfere with one another, particularly where the adjacent cells are using one or more common subcarriers.

One exemplary methodology used to multiplex transmissions over two scheduling intervals is depicted in FIG. 7. A time-synchronized system is assumed, i.e. time slots are aligned across the cells in the system. In this example, the transmission takes place over a larger number of subcarriers in the odd slots while even slots are used for transmissions requiring fewer subcarriers. In slot#1, higher data rate transmissions may take place because all eight of the subcarriers (SC1 through SC8) are used to transmit data in parallel in the cells. In slot#2, each of the cells uses a different single subcarrier for lower data rate transmissions. In slot#3, again higher data rate transmissions take place on all the eight subcarriers (SC1 through SC8) in all the cells. In slot#4, cells 6 uses a single subcarrier, cells 1, 2, 3, and 4 use two subcarriers and cell 5 and 7 use three subcarriers respectively. By grouping the use of larger and smaller number of subcarriers into two distinctive time intervals, the probability of subcarrier collision during low subcarrier utilization periods can be minimized. For example, in time slot#2 where each cell performs transmission using a single subcarrier, no subcarrier collision happens resulting in improved SINR. Similarly, in slot#4, any given cell sees interference from at most one base station. For example, subcarrier#2 is used in cell 2 and 5 in slot#4.

In slots where a fewer subcarriers are used for transmissions, the allocation of subcarriers can be coordinated across different cells to reduce the probability of subcarrier collision across cells.

This invention discloses a scheme where a total scheduling interval is divided into at least two sub-intervals. In the first interval, data transmission takes place using a large number of subcarriers. In the second interval, a smaller number of subcarriers is used for transmission. Those skilled in the art, however, will appreciate that in some applications it may be useful to divide the total scheduling interval into three or more sub-intervals. In fact, where three sub-intervals are used, it may be practical to allocate subcarriers so that no two neighboring cells will use a common subcarrier within the same sub-interval.

Those skilled in the art will appreciate that the various system layers, routines, or modules illustrated in the various embodiments herein may be executable control units (such as scheduler 510 (see FIG. 5)). The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for controlling transmissions of subpackets formed from an encoded packet over a plurality of subcarriers during a scheduling interval for the encoded packet, the method comprising: transmitting information indicative of a first portion of the subpackets over a first number of the subcarriers during a first period of time in the scheduling interval at a first power determined based on the first number; and transmitting information indicative of a second portion of the subpackets over a second number of the subcarriers during a second period of time in the scheduling interval at a second power determined based on the second number, wherein:

transmitting information over the first number of the subcarriers during the first period of time further comprises transmitting information within a first and second adjacent cell over the first number of the subcarriers during a first period of time; and transmitting in formation over the second number of the subcarriers during the second period of time further comprises transmitting information within the first cell over the second number of the subcarriers during the second period of time and transmitting information within the second cell over a third number of the subcarriers during the second period of time, and wherein each of the subpackets formed from the encoded packet is a self-decodable subpacket so that the information in the encoded packet can be recovered by decoding each self-decodable subpacket independently of the other subpackets formed from the encoded packet.

2. A method, as set forth in claim 1, wherein the first number of subcarriers is greater than the second number of subcarriers and the first power is less than the second power.

3. A method, as set forth in claim 1, wherein the second and third numbers of the subcarriers includes a unique set of subcarriers.

4. A method, as set forth in claim 1, wherein:
transmitting information over the first number of the subcarriers during the first period of time further comprises transmitting information within a plurality of cells over the first number of the subcarriers during a first period of time; and
transmitting information over the second number of the subcarriers during the second period of time further comprises transmitting information within each of the plurality of cells over the second number of the subcarriers during the second period of time with adjacent cells receiving information over a unique number of the subcarriers.

5. A method, as set forth in claim 1, further comprising dividing available power substantially equally among the first number of the subcarriers.

6. A method, as set forth in claim 1, further comprising dividing available power substantially equally among the second number of the subcarriers.

7. A method, as set forth in claim 1, wherein:
transmitting information over the first number of the subcarriers during the first period of time further comprises transmitting information over the first number of the subcarriers during a first time slot; and transmitting information over the second number of the subcarriers during the second period of time further comprises transmitting information over the second number of the subcarriers during a second time slot.

8. A method, as set forth in claim 1, wherein:
transmitting information over the first number of the subcarriers during the first period of time further comprises transmitting information over the first number of the subcarriers during a first time interval within a slot; and
transmitting information over the second number of the subcarriers during the second period of time further comprises transmitting information over the second number of the subcarriers during a second time interval within the slot.

9. A method for communicating subpackets formed from an encoded packet over a plurality of subcarriers during a scheduling interval for the encoded packet, the method comprising: receiving information indicative of a first portion of the subpackets over a first number of the subcarriers during a first period of time in the scheduling interval at a first power determined based on the first number; and receiving information indicative of a second portion of the subpackets over a second number of the subcarriers during a second period of time in the scheduling interval at a second power determined based on the second number, wherein: receiving information over the first number of the subcarriers during the first period of time further comprises receiving in formation over a substantial number of the plurality of subcarriers during the first period of time; and wherein the second number of the subcarriers is a subset of the first number of the subcarriers, and wherein each of the subpackets formed from the encoded packet is a self-decodable subpacket so that the information in the encoded packet can be recovered by decoding each self-decodable subpacket independently of the other subpackets formed from the encoded packet.

10. A method, as set forth in claim 9, wherein the first number of subcarriers is greater than the second number of subcarriers and the first power is less than the second power.

11. A method, as set forth in claim 9, wherein receiving information over a substantial number of the plurality of subcarriers during the first period of time further comprises receiving information over all of the plurality of subcarriers during the first period of time.

12. A method for controlling transmissions of subpackets formed from an encoded packet over a plurality of subcarriers during a scheduling interval for the encoded packet, the method comprising: transmitting information indicative of a first portion of the subpackets over a first number of the subcarriers during a first period of time in the scheduling interval at a first data rate determined based on the first number; and transmitting information indicative of a second portion of the subpackets over a second number of the subcarriers during a second period of time in the scheduling interval at a second data rate determined based on the second number, wherein: transmitting information over the first number of the subcarriers during the first period of time further comprises transmitting information within a first and second adjacent cell over the first number of the subcarriers during a first period of time; and transmitting information over the second number of the subcarriers during the second period of time further comprises transmitting information within the first cell over the second number of the subcarriers during the second period of time and transmitting information within the second cell over a third number of the subcarriers during the second period of time, and wherein each of the subpackets formed from the encoded packet is a self-decodable subpacket so that the information in the encoded packet can be recovered by decoding each self-decodable subpacket independently of the other subpackets formed from the encoded packet.

13. A method, as set forth in claim 12, wherein the first number of subcarriers is greater than the second number of subcarriers and the first data rate is higher than the second data rate.

14. A method, as set forth in claim 12, wherein the first number of subcarriers is greater than the second number of subcarriers and the first data rate is higher than the second data rate.

15. A method for controlling transmissions of subpackets formed from an encoded packet over a plurality of subcarriers during a scheduling interval for the encoded packet, the method comprising: receiving information indicative of a first portion of the subpackets over a first number of the subcarriers during a first period of time in the scheduling interval at a first data rate determined based on the first number; and receiving information indicative of a second portion of the subpackets over a second number of the subcarriers during a second period of time in the scheduling interval at a second data rate determined based on the second number, wherein:
receiving information over the first number of the subcarriers during the first period of time further comprises receiving information over a substantial number of the plurality of subcarriers during the first period of time; and wherein the second number of the subcarriers is a subset of the first number of the subcarriers, and wherein each of the subpackets formed from the encoded packet is a self-decodable subpacket so that the information in the encoded packet can be recovered by decoding each self-decodable subpacket independently of the other subpackets formed from the encoded packet.

* * * * *